Patented June 30, 1953

2,644,011

UNITED STATES PATENT OFFICE 2,644,011

PROCESS FOR PRODUCING 4-AMINO-2-HYDROXYBENZOIC ACID

Robert P. Parker, Somerville, and James M. Smith, Jr., North Plainfield, N. J., assignors to American Cyanamid Company, New York, N. Y., a corporation of Maine No Drawing. Application November 8, 1950, Serial No. 194,733

6 Claims. (Cl. 260—519)

This invention relates to an improved process for preparing 4-aminosalicylic acid from m-aminophenol and a carbonate of potassium wherein the conversion of the m-aminophenol into 4-aminosalicylic acid is effected under substantially anhydrous conditions in the presence of carbon dioxide. In particular, it relates to improved processes wherein a dry, finely divided mixture of m-aminophenol and a carbonate of potassium is heated to a temperature between 150° and 190° C. in an atmosphere of carbon dioxide, while simultaneously comminuting the mixture and venting carbon dioxide to remove the water formed in the reaction.

4-aminosalicylic acid is used in large quantities as a drug in the treatment of tuberculosis. For these uses the product must be of extremely high purity, and as dosages are large, cost is an important factor. In the past 4-aminosalicylic acid and its salts have been prepared from m-aminophenol by various modifications of the Kolbe synthesis using an atmosphere of carbon dioxide, preferably under pressure. The original process developed in the 1880's in Germany uses ammonium carbonate. Other carbonates such as alkali metal carbonates were also proposed. Some of the processes are operated under anhydrous conditions at the start although water is developed in the process. In any event other processes use an aqueous medium. Yields in general were low which increased greatly the cost of 4-aminosalicylic acid because the raw material m-aminophenol is not a cheap raw material. Yields in aqueous processes have ranged around 40 percent or less. In a single reaction step, an improved process in aqueous medium permitted higher yields by recovering untreated m-aminophenol permitting total yields up to about 80 percent. However, this involved multiple reaction expense as the recovered m-aminophenol had to be reprocessed.

In the aqueous processes, the various carbonates were considered to be equivalent and in the modern processes, sodium carbonate has been used. However, neither sodium carbonate nor bicarbonate can be employed in dry processes. Decomposition of the resulting product starts and the yield and purity is not satisfactory. This is in marked contrast to the ordinary process of making salicylic acid where the reaction can be effected satisfactorily with dry sodium carbonate. According to the present invention it has been found that efficiencies exceeding materially even the best obtainable with the modern sodium bicarbonate process can be obtained by heating m-aminophenol with potassium carbonate or bicarbonate in a carbon dioxide atmosphere provided the carbon dioxide is continuously or substantially continuously vented. The venting removes water substantially as fast as it is formed, and we believe that this is an important factor in the improved yields and high purity of product obtained. The peculiar behavior of potassium carbonate and bicarbonate is not fully understood. The corresponding sodium salts will not give the high yields and high purity of product. Accordingly, the invention is not intended to be limited to any particular theory or mechanism of reaction.

Since the present invention is not limited in any way to pressure, it is advantageous to operate at very moderate pressures, preferably at about atmospheric pressure. More pressure does not cause harm but seriously complicates continuous operation in suitable apparatus, because of the need for intermittent venting to remove water, and as no advantage is obtained we prefer to operate without any appreciable carbon dioxide pressure more than that which is required to prevent leaking in of air and to provide for a satisfactory flow of carbon dioxide through the equipment so that water can be removed promptly.

The amount of carbonate to be used is not critical. In as much as the carbonate appears to take part in the reaction, it is preferable to use equi-molar amounts, or at most a slight excess. Larger amounts of carbonate do no harm but in general there is no advantage in going beyond 1½ mols per mol of m-aminophenol.

The temperature range which is employed will run from 150° C. to 190° C. with optimum results obtained between 165° C. and 175° C. Temperature control is not critical, which is an advantage of the present invention. It is desirable to effect an intimate contact of the solid reactants with a carbon dioxide gas. Any suitable equipment may be used which will insure good contact, a ball mill being preferred as it is simple and rugged and produces a product in the form of a free-flowing powder. However, any stirred reaction vessel suffices. Reaction time is also not critical and will vary with the size of the batch and the nature of equipment used. In general the reaction is not a rapid one and reaction times from 2 to 10 hours are frequently needed.

The yield obtained by the process of the present invention runs from just under 90 percent to somewhat over 90 percent. This is in marked contrast to the 40–45 percent yields obtained in the best prior art processes and even higher in a single reaction operation than could be obtained by the best process in which m-aminophenol is recovered and reused. Even with the cost of recovery and reprocessing, the total yield in a number of steps did not exceed about 80 percent. In other words, in one operation the process of the present invention produces almost twice as much 4-aminosalicylic acid and produces 10 percent more than can be obtained by prior processes even with recovery of unreacted m-aminophenol and reprocessing.

The reaction product obtained is of high quality and is free from impurities which cannot easily be separated.

The invention will be described in greater detail in connection with the following specific examples, the parts being by weight.

*Example 1*

54.6 parts of finely powdered m-aminophenol and 76 parts of finely ground calcined potassium carbonate are introduced into a ball mill of 1000 parts capacity, the ball mill being purged by a continuous flow of carbon dioxide at approximately atmospheric pressure. Sufficient iron balls are present to maintain the charge in the form of a free-flowing powder. The reaction is continued for 8 hours at 175° C. As water is formed in the reaction it is continuously removed by the stream of carbon dioxide passing through the ball mill.

After reaction is complete, the powdered product is dissolved in 250 parts of water and the solution clarified with activated carbon. Thereupon, concentrated hydrochloric acid is added until a pH of 2.5–3.5 is reached. 4-aminosalicylic acid is precipitated, filtered off and washed with ice water, followed by drying at 45° C. A yield of slightly over 90 percent is obtained.

The average of several large batches, of more than 1000 pounds per batch gave about 90 percent of the theoretical yield.

*Example 2*

The procedure of Example 1 is followed but the carbon dioxide is maintained under 25 pounds pressure and venting is frequent but intermittent. The yield is about 90 percent.

What we claim is:

1. A process of producing 4-aminosalicylic acid from m-aminophenol and a carbonate of potassium wherein the conversion of the m-aminophenol into 4-aminosalicylic acid is effected under substantially anhydrous conditions in the presence of carbon dioxide, which comprises heating a dry, finely divided mixture of m-aminophenol and a carbonate of potassium to a temperature between 150° and 190° C. in an atmosphere of carbon dioxide, until said conversion is effected and simultaneously comminuting the mixture during said heating and venting carbon dioxide at sufficiently frequent intervals to remove the water formed in the reaction substantially as it is formed.

2. A process according to claim 1 in which the carbon dioxide is flowed over the reactants in a continuous stream at a pressure not exceeding one atmosphere.

3. A process according to claim 2 in which the temperature is 165° C.–175° C.

4. A process according to claim 1 in which the carbonate is anhydrous $K_2CO_3$.

5. A process according to claim 4 in which the carbon dioxide is flowed over the reactants in a continuous stream at a pressure not exceeding one atmosphere.

6. A process according to claim 5 in which the temperature is 165° C.–175° C.

ROBERT P. PARKER.
JAMES M. SMITH, Jr.

References Cited in the file of this patent

UNITED STATES PATENTS

| Number | Name | Date |
|---|---|---|
| 166,863 | Graf | Aug. 17, 1875 |
| 427,565 | Guehm et al. | May 13, 1890 |
| 529,182 | Marasse | Nov. 13, 1894 |
| 1,847,518 | Laska et al. | Mar. 1, 1932 |
| 2,540,104 | Doub | Feb. 6, 1951 |
| 2,540,785 | Hultquist | Feb. 6, 1951 |

FOREIGN PATENTS

| Number | Country | Date |
|---|---|---|
| 12,191 | Great Britain | of 1889 |
| 78,708 | Germany | Nov. 29, 1894 |
| 127,813 | Sweden | Apr. 4, 1950 |
| 266,638 | Switzerland | Apr. 17, 1950 |

OTHER REFERENCES

Erlenmeyer et al., Helv. Chim. Acta., vol. 31, p. 989 (1948).